United States Patent
Yasarapu et al.

(10) Patent No.: US 10,679,191 B2
(45) Date of Patent: Jun. 9, 2020

(54) PERSONALIZED MULTI-USER LOCATION-BASED EVENT SCHEDULING, MANAGEMENT, AND COORDINATION SYSTEMS AND METHODS

(71) Applicant: MasterCard International Incorporated, Purchase, NY (US)

(72) Inventors: Lova Padmini Devi Yasarapu, Town and Country, MO (US); Jarrett Northington, Wentzville, MO (US); Linda M. Mautz, O'Fallon, MO (US); Erika Joann Robeen, Hardin, IL (US); Ping X. Chen, Chesterfield, MO (US); Cassandra Boland, Washington, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 267 days.

(21) Appl. No.: 15/648,295

(22) Filed: Jul. 12, 2017

(65) Prior Publication Data
US 2019/0019161 A1    Jan. 17, 2019

(51) Int. Cl.
G06Q 10/00    (2012.01)
G06Q 10/10    (2012.01)

(52) U.S. Cl.
CPC ................ *G06Q 10/1095* (2013.01)

(58) Field of Classification Search
None
See application file for complete search history.

(56) References Cited

U.S. PATENT DOCUMENTS

| | | | |
|---|---|---|---|
| 5,790,974 A | * | 8/1998 | Tognazzini .......... G01C 21/343 340/988 |
| 5,948,040 A | * | 9/1999 | DeLorme .............. G01C 21/36 340/990 |
| 6,732,080 B1 | | 5/2004 | Blants |
| 7,693,735 B2 | * | 4/2010 | Carmi ........... G06Q 10/063116 705/7.16 |
| 8,005,703 B2 | | 8/2011 | Chakra et al. |
| 8,451,112 B2 | | 5/2013 | Kim et al. |
| 8,972,429 B2 | | 3/2015 | Goldstein et al. |
| 9,082,111 B2 | | 7/2015 | Cronin |
| 9,129,264 B2 | | 9/2015 | Lyle et al. |
| 9,269,098 B2 | | 2/2016 | Koukoumidis et al. |

(Continued)

OTHER PUBLICATIONS

Banta, Vikul, Four Ways to Optimize Your Maintenance and Service Scheduling, May 22, 2017, IBM, https://www.ibm.com/blogs/internet-of-things/iot-optimize-maintenance-scheduling/ , p. 1-8.*

*Primary Examiner* — Joseph M Waesco
(74) *Attorney, Agent, or Firm* — Armstrong Teasdale LLP

(57) ABSTRACT

A location-based event scheduling and coordination system includes at least one host computing device configured to accept from at least one user a first event and a second event at respectively different locations to be successively attended. The host computing device automatically considers location-based information for each of the first event and the second event to determine a possible scheduling conflict between the first event and the second event, and if a possible scheduling conflict is determined, automatically notifies the at least one user.

24 Claims, 6 Drawing Sheets

(56) References Cited

U.S. PATENT DOCUMENTS

| | | | |
|---|---|---|---|
| 9,348,897 B2 | 5/2016 | Shoham et al. | |
| 9,510,144 B2 * | 11/2016 | Lefkowitz | G06Q 50/01 |
| 10,108,935 B2 * | 10/2018 | Dhillon | G06Q 10/1095 |
| 2003/0131059 A1 | 7/2003 | Brown et al. | |
| 2008/0059256 A1 * | 3/2008 | Lynch | G06Q 10/063 705/7.24 |
| 2008/0114716 A1 * | 5/2008 | Mock | G06Q 10/109 |
| 2008/0167937 A1 * | 7/2008 | Coughlin | G01C 21/20 705/7.16 |
| 2008/0243582 A1 * | 10/2008 | Chen | G06Q 10/06314 705/7.19 |
| 2008/0281665 A1 | 11/2008 | Opaluch | |
| 2010/0050185 A1 * | 2/2010 | Doss | G06Q 10/109 718/108 |
| 2012/0259842 A1 | 10/2012 | Oman et al. | |
| 2013/0024203 A1 | 1/2013 | Flores et al. | |
| 2013/0275417 A1 | 10/2013 | Fernandes | |
| 2014/0058768 A1 | 2/2014 | Moxley et al. | |
| 2014/0187213 A1 * | 7/2014 | Shuster | H04W 4/023 455/414.1 |
| 2014/0189016 A1 * | 7/2014 | Goldsmith | G06Q 10/06 709/205 |
| 2014/0235276 A1 * | 8/2014 | Lefkowitz | G06Q 50/01 455/456.3 |
| 2014/0278057 A1 * | 9/2014 | Berns | G01C 21/3484 701/410 |
| 2014/0278680 A1 | 9/2014 | Mermelstein | |
| 2015/0006221 A1 * | 1/2015 | Mermelstein | G06Q 10/1093 705/7.19 |
| 2015/0019642 A1 * | 1/2015 | Wang | H04L 67/306 709/204 |
| 2015/0045068 A1 * | 2/2015 | Soffer | H04W 4/025 455/456.3 |
| 2015/0324752 A1 * | 11/2015 | Chen | G06Q 10/1095 705/7.19 |
| 2015/0324753 A1 * | 11/2015 | Dantuluri | G06Q 10/1095 705/7.19 |
| 2016/0255466 A1 * | 9/2016 | Shuster | H04W 4/023 455/414.3 |
| 2016/0267439 A1 * | 9/2016 | Bitran | G06Q 10/1093 |
| 2016/0277881 A1 * | 9/2016 | Lefkowitz | G06Q 50/01 |
| 2016/0300192 A1 * | 10/2016 | Zamer | G06Q 10/1095 |
| 2016/0357768 A1 | 12/2016 | Strong et al. | |
| 2017/0059337 A1 * | 3/2017 | Barker | G06F 16/955 |
| 2017/0163747 A1 * | 6/2017 | Lefkowitz | G06Q 50/01 |
| 2017/0337492 A1 * | 11/2017 | Chen | G06Q 10/0633 |
| 2017/0372271 A1 * | 12/2017 | Goldsmith | G06Q 10/06 |
| 2018/0070203 A1 * | 3/2018 | Shuster | H04W 4/023 |

* cited by examiner

PERSONALIZED MULTI-USER LOCATION-BASED EVENT SCHEDULING, MANAGEMENT, AND COORDINATION SYSTEMS AND METHODS

BACKGROUND OF THE INVENTION

This disclosure relates generally to electronic systems and methods for scheduling and coordinating events at different locations, and more specifically to a multi-user personal digital assistant system and method for location-based scheduling, management, and coordination of family activities.

Managing a household, and especially households including children, is challenging in a number of aspects. Among these is coordinating various activities for members of the family, both individually and as a group, for events outside of the home. In the case of parents having more than one child, it is not uncommon for their children to engage in different activities in different locations at different times. In combination with tasks and events that the parents are obliged to perform or attend to on their own, transporting the kids to and from their activities, in combination with attending or pursuing other family outings and interests, can sometimes be daunting. Many parents can admit to occasionally, if not frequently, feeling overwhelmed by a packed schedule of weekend events, if not throughout the week.

Electronic calendaring systems exist that parents may use to some extent to help organize and manage household activities and events. Conventional calendaring systems have certain limitations, however, and have yet to fully meet the needs of parents that are on the move. Improvements are accordingly desired.

BRIEF DESCRIPTION

In one aspect, the disclosure provides a location-based event scheduling and coordination system including at least one host computing device comprising at least one processor in communication with a memory device. The at least one host computing device is configured to: accept from at least one user a first event and a second event at respectively different locations to be successively attended; automatically consider location-based information at a first point in time for each of the first event and the second event to determine a possible scheduling conflict between the first event and the second event; and if a possible scheduling conflict is determined, automatically notify the at least one user.

In another aspect, the disclosure provides a location-based event scheduling and coordination system method. The method is implemented with at least one host computing device having at least one processor in communication with a memory device, and the method includes: accepting from at least one user and with the at least on processor a first event and a second event at respectively different locations to be successively attended; automatically considering at a first point in time location-based information for each of the first event and the second event to determine a possible scheduling conflict between the first event and the second event; and if a possible scheduling conflict is determined, automatically notifying the at least one user.

DETAILED DESCRIPTION OF THE DISCLOSURE

Figure 1:
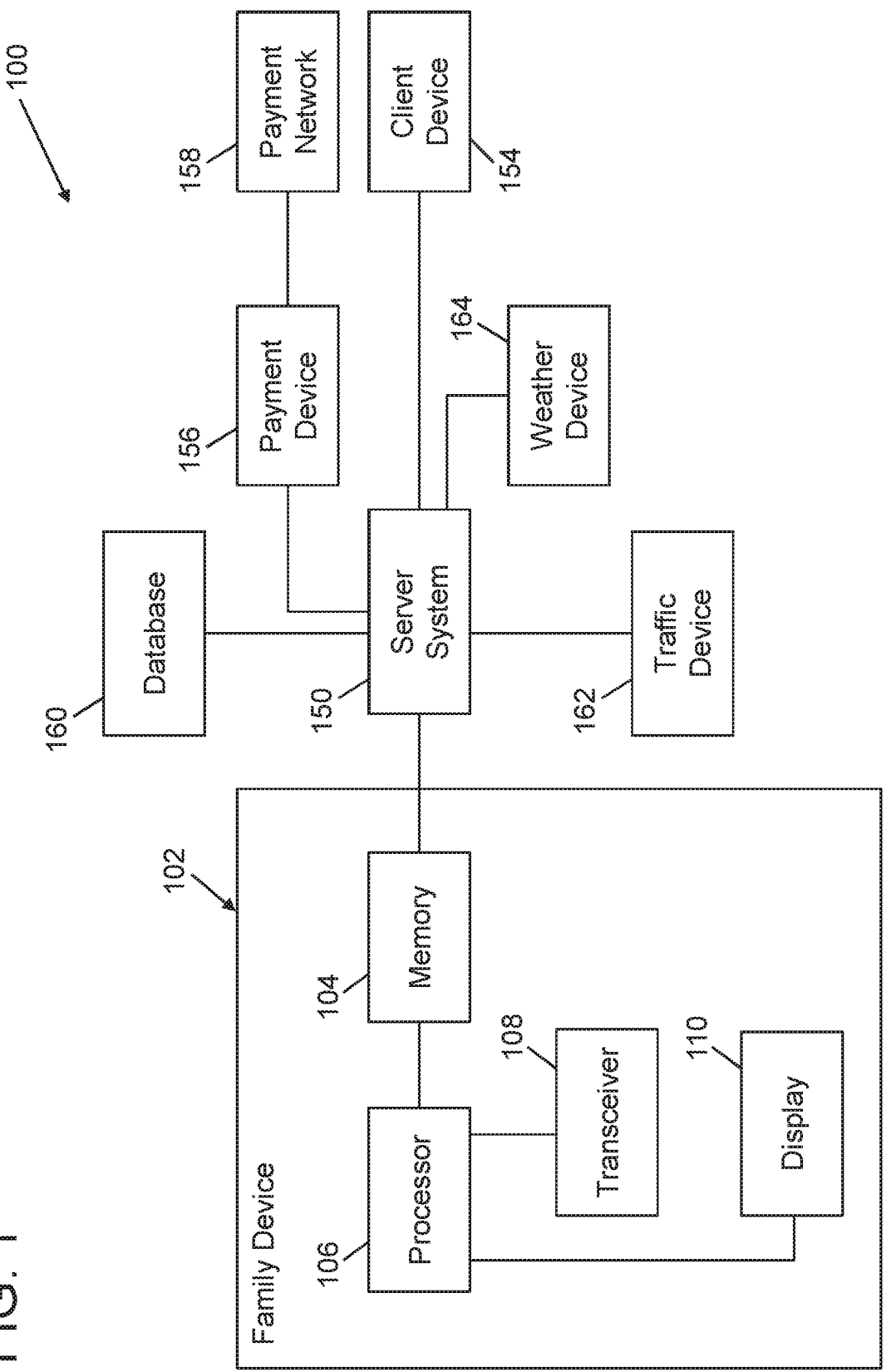
FIG. 1 illustrates an example embodiment of a system including personalized multi-user location-based event scheduling, management and coordination components.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The system and methods described herein are configured to address certain problems and challenges in scheduling, managing and coordinating household activities outside the home. Such problems and challenges are further discussed below followed by exemplary systems and methods that overcome such problems and challenges.

With respect to requests or invitations to attend events outside the home, parents or other heads of household sometimes face some relatively complex and difficult choices. Especially for households including a limited number of drivers but a potentially large number of events in different locations, a number of logistical problems are presented.

A preliminary set of issues is presented in selecting events to attend. Parents, or other heads of household, typically face a mix of recurring events and special events that must be considered in deciding whether or not to attend an event. Logically, the time and location of an event is often key to determining whether or not a given event can be attended. Typically, the number of drivers and the number of vehicles that may be used to get to events is limited, and parents accordingly must at times make some difficult choices. In doing so, parents sometimes suffer from an inability to completely understand the time and space relations of events and constraints imposed.

Recurring events may include, for example, regularly scheduled activities at a set time and place or location. For example, recurring events may include things such as practices for sports and athletic activities, scouting activities, music practices, or other clubs. Such regularly scheduled events also tend to be associated with non-regularly scheduled events at various different locations such as sports games or tournaments, camping trips or other non-recurring scouting activities, music recitals, music concerts, or other club events. In the case of children, they must be dropped off and picked up from each event as it occurs, separate and apart from possible recurring events that the parents may be obligated to attend.

In contrast to recurring events, non-recurring events include single events such as birthday parties and social outings. Considering a married couple with multiple children, different ones of the children are often invited to different birthday parties and social outings, sometimes on the same day or during the same evening while being at different locations. Other non-recurring events may include graduation parties, holiday events and gatherings, weddings, anniversary parties, graduation parties or other social events. Of course, the parents are sometimes invited to non-recurring events such as these as well, and sometimes attend them with or without the rest of the family.

As additional considerations, households or families may also take vacations or trips together at times of their choice, and also may attend special events such as concerts, shows, or engage in group activities as desired. Sometimes these are decided and known well in advance, although conflicting events may very well arise. Additionally, working parents may incur work-related travel and work-related events that impose limitations on accepting events at certain times. Reconciling individual obligations of parents and children is sometimes a confusing and mistake prone process.

In view of the vast number of recurring and non-recurring events possible for a family of even a modest size, just sorting through the possible event options that are possible to attend is sometimes difficult to do. Many events may not be of any real interest to the family, although the family may receive a number of invitations and advertisements to attend them via various platforms, while events of actual interest will sometimes go unnoticed. As a result, parents and heads of household, and by implication their children, may sometimes miss an opportunity to attend an otherwise desirable event out of a lack of awareness that the event is being held, or an overlooked, misplaced or unanswered invitation or advertisement. Some invitations or advertisements may be dismissed out of hand, sometimes unfairly or perhaps even by mistake, in view of a perceived inability to fit additional events into a packed schedule. Alternatively, a parent may sometimes commit to events that are later to be determined problematic at least in part because of an incomplete understanding of time and location constraints of other events.

Given that different children may pursue different interests and activities, and also that respective seasons for certain recurring activities may overlap with one another, substantial scheduling issues are multiplied by the number of children engaged in activities. For example, different children may be involved in different sports having practices or games at different locations on the same day. For different kids playing the same sport, they likewise will probably have practices or games at different locations on the same day in the course of a season. Coupled with other non-recurring special events, a family may easily have multiple events in different locations on any given weekend. In the example of a married couple with three children and two vehicles, accommodating multiple events for each of the three children (in addition to other family events) requires much cooperation. If only one driver or one vehicle is available, it may not be possible to attend all of the events without third party assistance. Regardless, and especially for unfamiliar event locations to the driver(s), travel time and difficulty to navigate between event locations may easily be underestimated.

While electronic calendar systems exist in which parents may note activities and events and set reminders, difficulty and confusion may still result insofar as events are concerned. Specifically, each parent may individually use a different calendar system that only they can access and review at any given point in time, such that the parents may inadvertently or unknowingly have discrepancies in their calendars. Events shown on one calendar may not be shown on the other, and either calendar may include mistakes such as events that have been calendared at an incorrect date or time. Also, some confusion may arise between parents regarding which one of them is responsible to drive a child to an event on their calendar or pick the child up after the event. The location of the event may further not even be apparent from the calendars used, causing one or both parents to consult additional sources to find the location.

Determined parents or heads of household may diligently plan out schedules and arrange for transportation to various events, but at times the best of plans can be upset by unpredictable events. For example, changing weather conditions, traffic delays, or other issues may cause impediments to arriving at an event on time. A given commute between different event locations in good weather and normal traffic may not be possible to accomplish in the same timeframe given inclement weather or abnormal traffic conditions. As such weather and traffic conditions may be unforeseeable, they may result in delay in arriving to an event. For various reasons, the parent/driver may not be able to quickly or effectively communicate to others when such delays arise. As such, a failure to arrive on time to an event may be cause for concern to those who are expecting them.

In view of the above, existing electronic calendar systems and methods are not well suited to meet the particular needs of parents in the scenarios described above. While they can provide effective notice and reminders or events, they are prone to mistake and human error in that events may not be properly entered or may not be entered at all, resulting an in incomplete or inaccurate calendar that may not be apparent to either parent in time to make corrections to ensure that an event is not missed. Also, each parent may access their calendar with a different device carried by them, such that the other parent may not easily access or see the other parent's calendar to compare to their own. Even if events are properly entered, a parent may misread the calendar, fail to understand it, or fail to follow it, in which case events may be missed or late arrivals to events may occur.

For a parent following a conventional calendar system, which may include a reminder for an event that has been entered on the system, even if a parent follows the calendar it will not necessarily ensure a timely arrival to an event. Successive events may simply be too far apart for the parent to get from one event to another in the desired timeframe, or as mentioned above unexpected weather or traffic conditions may prevent a timely commute from one event to another. Conventional calendar systems are static in nature and operate only in reference to time. Conventional calendar systems do not dynamically analyze events for potential problems and conflicts with respect to their locations as they relate to event timing, and do not take into account real-time weather and traffic information that can be proactively used to avoid problems and conflicts in attending events.

Finally, certain events require fees that must be paid using separately provided systems and/or tickets to be presented to attend an event. In some cases, and in part because of the separate systems involved, event fees may be paid but the event may not be calendared, or vice versa. Also, an event may be calendared but one may travel to the event without realizing that tickets are needed. The tickets, whether electronic or non-electronic, may not be easily located at the time of the event, leading to further inconvenience to all involved.

The methods and systems described below overcome the difficulties described above and beneficially allow dynamic and intelligent, location-based scheduling, monitoring, coordination and management of events to assist parents or heads of households in maximizing effective participation in activities away from home for themselves and their children.

More specifically, the dynamic calendaring systems and methods described below include a plurality of computing devices communicating with one another, and at least some of the devices communicating with an interchange network (e.g., a payment network) to process payment-by-card transactions. Users may create household profiles with the system including information regarding the various family/household members and their interests, and also to identify eligible drivers for events scheduled on the system.

Using client portals, more than one member of the household can enter or accept events to be scheduled, and the system may display one calendar including all accepted events that multiple family members may view. Drivers may be designated for each event and displayed on the calendar with other useful event information. Multiple users in the same household may therefor see and use the same calendar including all events, with some customization or personalization in the display presented to each particular user. For example, a designated event driver may see or be provided with information that a non-designated driver may not see, and a child may see different information than a parent may see.

The systems and methods of the disclosure can dynamically take into accounted expected travel times between the locations of different events to be scheduled (or that are already scheduled) on the same day. The system may identify potential location-based conflicts in events at the time of scheduling, and also in real-time as event times are approached based on event location information and needed time to travel between events in view of actual weather and traffic conditions. The system may intelligently allow for adjustments in the schedule as travel times are determined between different events. Alerts, notifications, and updates can be sent automatically by the system to allow drivers to adjust departure times to accommodate actual traffic and weather conditions and increase a likelihood of on-time arrival to events. In some cases, the system may also re-schedule events or make recommendations to a user based on location-based considerations, and also weather and traffic conditions.

Based on the household profiles the systems and methods of the disclosure can also recommend events and provide notifications of possible events of interest. If recommended events are accepted by a user, they can be automatically added to the calendar. Additionally, a user may add events to the calendar as desired. A designated driver may be identified for each event at the time of scheduling, and driver information may be included on the calendar to avoid possible confusion regarding who is responsible for driving to the event. Contact information for each event, and also other members of the household, may also be accepted and stored in the system, and if the system detects an impending late arrival to an event because of weather or traffic conditions (or perhaps just a late start) the system can automatically provide notice to the contact person that a late arrival is expected.

Any fees for events scheduled with the systems and methods of the disclosure may be conveniently paid and charged to a user through a payment-by-card transaction system. Electronic tickets and the like may be sent to user devices for presentation at the event and linked to the events on the displayed schedule. The electronic tickets and the like may be accessed directly from the calendar using a mobile device with maximum convenience to the user.

In one embodiment, the disclosure provides a location-based event scheduling and coordination system including at least one host computing device comprising at least one processor in communication with a memory device. The at least one host computing device is configured to: accept from at least one user a first event and a second event at respectively different locations to be successively attended; automatically consider at a first point in time location-based information for each of the first event and the second event to determine a possible scheduling conflict between the first event and the second event; and if a possible scheduling conflict is determined, automatically notify the at least one user.

The at least one host computing device may also be configured to: automatically determine at the first point in time a first expected travel time from a location of the first event to the location of the second event; and based on the determined first expected travel time from the location of the first event to the location of the second event, notify the at least one user of a possible scheduling conflict.

The at least one host computing device may further be configured to: automatically determine at a second point in time subsequent to the first point in time, real-time traffic conditions between an actual location of the at least one user and a location of one of the first event and the second event; and determine a second expected travel time from the actual location to the location of one of the first event and the second event in view of real-time traffic conditions. The at least one host computing device is also configured to: automatically determine a possible scheduling conflict based on the second expected travel time; and if a possible scheduling conflict is determined, notify the user of a proposed adjustment to the schedule.

The at least one host computing device may likewise be configured to: determine at a second point in time subsequent to the first point in time, real-time weather conditions between an actual location of the at least one user and a location of one of the first event and the second event; and if a possible scheduling conflict is determined, notify the user of a proposed adjustment to the schedule.

The at least one host device may be configured to accept profile information for multiple members of a household of the at least one user, to accept designated event driver information for each of the first event and the second event, and display a schedule including the first event and the second event to multiple members of the household. The display may be personalized to different ones of the multiple members of the household.

The at least one host computing device may be in communication with a payment network for processing a payment-by-card transaction of a fee for at least one of the first event and the second event. If the processed fee is approved, generate a display wherein electronic tickets are linked to the at least one of the first event and the second event. The at least one host computing device may also be configured to accept contact information for scheduled events, and automatically generate late arrival notices based on the location-based information and the contact information.

In another embodiment, the disclosure provides a location-based event scheduling and coordination method. The method is implemented with at least one host computing device having at least one processor in communication with a memory device, and the method includes: accepting from at least one user and with the at least on processor a first event and a second event at respectively different locations to be successively attended; automatically considering location-based information at a first point in time for each of the first event and the second event to determine a possible scheduling conflict between the first event and the second event; and if a possible scheduling conflict is determined, automatically notifying the at least one user.

The method may also include: automatically determining at the first point in time a first expected travel time from a location of the first event to the location of the second event at a time of acceptance of the scheduling of the second event; and based on the determined first expected travel time from the location of the first event to the location of the second event, notifying the at least one user of a possible scheduling conflict. The method may further include: automatically determining, at a second point in time subsequent to the first point in time, real-time traffic conditions between an actual location of the at least one user and a location of one of the first event and the second event; and determining a second expected travel time from the actual location to the location of one of the first event and the second event in view of the real-time traffic conditions. The method may include: automatically determining a possible scheduling conflict based on the second expected travel time; and if a possible scheduling conflict is determined, notifying the user of a proposed adjustment to the schedule.

The method may likewise include: determining, at a second point in time subsequent to the first point in time, real-time weather conditions between an actual location of the at least one user and a location of one of the first event and the second event; and if a possible scheduling conflict is determined, notifying the user of a proposed adjustment to the schedule.

The method may include accepting profile information for multiple members of a household of the at least one user, and accepting designated event driver information for each of the first event and the second event. The method may include displaying a schedule including the first event and the second event to multiple members of the household, and personalizing the display for different ones of the multiple members of the household. The method may also include processing a payment-by-card transaction of a fee for at least one of the first event and the second event, and if the processed fee is approved, generating a display wherein electronic tickets are linked to the at least one of the first event and the second event. The method may also include accepting contact information for scheduled events, and automatically generating late arrival notices based on the location-based information and the contact information.

The technical problems addressed by the location-based event scheduling systems and methods of the disclosure include at least one of: (i) inability to identify location-based scheduling conflicts between different events at respective locations; (ii) inability to account for needed travel times in scheduling events at different locations; (iii) inability to account for weather conditions in scheduling events at different locations; (iv) inability to account for discrepancies in electronic calendars of different persons in the same household; (v) inability to prevent human error in calendaring or scheduling events; (vi) inability to avoid human confusion regarding scheduled or calendared events; and (vii) inability to efficiently pay for event fees when calendaring events; (viii) inability to accept, store and retrieve electronic tickets from a single system; and (ix) inability to effectively communicate with other persons when the schedule cannot be met.

The location-based event scheduling systems and methods systems of the disclosure may be implemented using computer programming or engineering techniques including computer software, firmware, hardware, or any combination or subset thereof, wherein the technical effects may be achieved by (i) considering location-based travel information between events when scheduling them; (ii) accounting for traffic conditions in determining travel time for scheduling events; (iii) accounting for weather conditions in determining travel time for scheduling events; (iv) displaying a single event schedule to multiple members of the same household; (v) displaying a designated driver for scheduled events; (vi) displaying personalized calendar views to different members of the household; (vii) automatically notifying the household of events of interest; (viii) automatically adding certain events to the calendar; (ix) linking electronic tickets and the like directly to the calendar for ease of access; and (x) providing automated communication concerning late arrival to scheduled events.

The resulting technical benefits achieved by the payment card systems and methods include at least one of: (i) eliminating location-based conflicts when scheduling events; (ii) incorporating traffic condition information in determining travel time for scheduling events and notifying drivers of real time travel conditions and possible adjustments in the schedule; (iii) incorporating weather conditions in determining travel time for scheduling events and notifying drivers of developing real-time travel conditions and possible adjustments to the schedule of events; (iv) displaying a single schedule of events to multiple members of the same household for review; (v) including designated event driver information in a display of scheduled events; (vi) personalizing calendar views displayed to different members of the household having different informational needs; (vii) automatically identifying and notifying the household of events of interest; (viii) automatic scheduling of certain events to the calendar to avoid human error; (ix) making electronic tickets and the like directly available from the calendar; and (x) generating automated messages and alerts to designated persons of travel delays.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps), and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

Embodiments described herein may relate to a transaction card system, such as a credit or debit card payment system using the Mastercard® or Visa® payment network. The Mastercard® payment network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.). Embodiments described herein may also relate to digital payment services such as digital payment services such as Masterpass by Mastercard.

FIG. 1 illustrates an example embodiment of a location-based event scheduling and coordination system 100 that is configured to provide location-based conflict identification and real-time adaptability of scheduling of successive events to overcome the technical problems described above and confer the substantial technical effects and technical benefits disclosed herein. The system 100 as shown includes at least one family/household user device 102 that in the example shown includes a memory 104, a processor 106, a transceiver 108, and a display 110.

The system 100 may also include a server system 150 that may communicate with the family/household user device 102 as well as a client device 154, an optional payment device 156, a payment network 158, a database 160, and in some embodiments a traffic device 162 and a weather device 164 as described further below. The server system 150 may communicate with, request, accept and retrieve data and information from each of the devices 102, 152, 154, 156, 158, 160, 162 and 164 as explained below. The server system 150 is sometimes referred to herein as a "host" device that includes the location-based scheduling components described further below, although it is not strictly necessary in all embodiments that the host device is a server system.

In contemplated examples, the family/household user device 102 is connected directly or indirectly to the server system 150 via wired or wireless communication techniques and protocols. In one contemplated example, family/household user device 102 is used by a parent or child to view schedule information from the server system 150, and via the display 110 the cardholder may see event notification or alerts, scheduled events and location-based conflict information as explained in detail below. Specifically with respect to the systems and methods of the invention, the display 110 may allow the user to avoid inadvertent location-based conflicts in scheduled events, as well as to receive information, feedback and alerts on developing conditions that may result in location-based conflicts if action is not taken to avoid them. The family/household user device 102 may be, but is not necessarily limited to, a computer workstation, a personal computer, a laptop or notebook computer, a tablet device or a smartphone. It is contemplated that multiple family/household user devices 102 may be provided to different members of the household for use with the system 100. For example, each parent and one or more children may each have a family/household user device 102 allowing them to communicate with the system 100 and with one another. In the case of a portable or handheld family/ household user device 102, they may accompany the parent(s) or children to and from a scheduled event.

The client device 154 in contemplated embodiments may be used for authorized cardholder enrollment (and authorized user enrollment) by card issuers, payment network personnel, or system administrators. Enrollment may include appropriate explanation of the features implemented by the system 100 and opt-in, informed consent by the authorized cardholder or user consistent with applicable privacy and data usage laws and regulations. The client device 154 may also be utilized to, for example, enroll participating merchants and communicate merchant information to the other devices in the system 100, retrieve data from one or more of the system devices to assess its performance, troubleshoot the system, perform system updates, etc. The client device 154 may be, but is not necessarily limited to, a computer workstation, a personal computer, a laptop or notebook computer, a tablet device or a smartphone. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

The payment device 156 accepts payment card transaction requests and performs payment processing for payment-by-card transactions as described above. The payment system 156 communicates with a payment network 158, which may be an interchange network described above, to process and approve a request for payment of an event through the system in the applicable amount. While a separate payment device 156 is shown in FIG. 1, another device in the system may alternatively communicate with the payment network 158 without first passing through a dedicated payment device 156. Multiple payment devices 156 may be in the network 100 and be utilized by different financial institutions, including but not necessarily limited to the issuer, acquirer, or third party processor in a multi-party payment system.

In a variety of contemplated examples, different combinations of devices, being the same or different from one another, may be utilized in the system 100 with otherwise similar effect. One or more of the devices 102, 152, 154 and 156 shown in FIG. 1 may be a mobile device, such as any mobile device capable of interconnecting to the Internet including a smart phone, personal digital assistant (PDA), a tablet, or other web-based connectable equipment. Alternatively, one or more of the devices 102, 152, 154 and 156 may be a desktop computer or a laptop computer. Each of the devices 102, 152, 154 and 156 may be associated with a different user as described. Each device 102, 152, 154 and 156 may be interconnected to the Internet through a variety of interfaces including a network, such as a local area network (LAN) or a wide area network (WAN), dial-in connections, cable modems and special high-speed ISDN lines.

The traffic device 162 includes map information and data and is specifically configured to compute a driving time to travel between a beginning destination to an end destination. As such, the traffic device 162 may provide an expected travel time from the home of the family/household to a scheduled event, or from one event location to another. The computed travel time may made in view of real-time traffic conditions at the time that a request is made, and according the travel time may vary depending on time of day and specifics of the route selected to get from one location to another. Such traffic devices and associated systems are known and not described further herein. In the case of a family/household user device 102 that has location services enabled, the location of the family/household user device 102 may be provided to the system 100 and when needed may be utilized as the beginning location. As described below, the system may determine travel time via the traffic device 162 at different times, once at the time of initial scheduling and again as a time for scheduled events approaches.

The weather device 164 include map information and up to date weather and forecast data for further use by the system in determining expected travel times from a beginning destination to an end destination. Real-time weather conditions are considered for possible impact on travel time between an actual location of a user (e.g., the home of the family/household or any other location) to a location of scheduled event along a desired route, or along a route from one event location to another. Inclement weather that may reduce travel speed can be taken into account in identifying location-based conflicts and alerts as the system operates. Such weather devices and associated systems are known and not described further herein. While the traffic device 162 and weather device 164 are shown as separate devices, they may in some cases be combined in a single device, and in other cases the functionality of the devices 162, 164 may be integrated in the server system 150 as desired.

Dynamic and intelligent event selection, avoidance of location-based conflicts between events, monitoring of developing conditions to identify scheduling issues, active management and adjustments to the schedule, and automated communication of status to other parties is possible to avoid problems and difficulties presented by conventional, static calendar systems.

The system accepts a profile including for example, the names of family/household members, their ages, interests of each member, contact information for each member (e.g., a cell phone number), and identification of drivers for possible events to be scheduled. Based on the profile, the system can send notifications, alerts, invitations, or recommendations to events that match the interests of one or more family members. If such events are accepted by a user, they are automatically entered on the system calendar at the proper date and time. A driver may be assigned to each event as it selected, and the driver and event location may be displayed by the system. Different members of the family/household (e.g., both parents) may accept events, and all members of the family can see all accepted events. Additionally, different members of the family/household may manually enter events as desired, with the system prompting them for complete event information, including but not necessarily limited to designated event driver information, location information, and contact information for delay notices.

At the time of initial scheduling of an event on the system 100, the system can determine location-based conflicts in relation to other scheduled events. For example, suppose the system already includes a recurring scheduled event at 10:00 AM on Saturday April 22 that corresponds to a one hour baseball practice for child A at the Municipal Park. If a user than tries to enter a birthday party event on Saturday April 22 at 11:30 AM on Saturday April 22 hosted at 506 N. 10$^{th}$ Street, the system can determine the travel time between Municipal Park and 506 N. 10$^{th}$ and if it finds that that expected travel time (as determined from the traffic device 162) is 45 minutes, the system can generate a notice or alert to the user at that time who may not realize that the second event (the birthday party) presents a location-based conflict with the first event. The conflict may be resolved in a number of ways, including possible solutions such as assigning different drivers to each of the two events, or perhaps to leave the baseball practice early in order to arrive on-time to the birthday party if a second driver is not available. This type of notification and alert may be particularly useful to identify and resolve scheduling conflicts when the system user is not familiar with one or both of the locations of the events involved. Depending on the magnitude of the conflict identified, the user may decide to cancel the first event in favor of the second, or to not accept the second event.

Following the same example of the baseball practice and the birthday party, suppose that the system can determine the travel time between the Municipal Park and 506 N. 10$^{th}$ is only 15 minutes at the time of scheduling of the birthday party. As such the system does not generate a notice or alert of a conflict with the baseball practice and the birthday party event can be accepted and added to the system calendar. If things go as expected, the entire baseball practice and can be attended, with plenty of time to get to the birthday party without being late.

On Saturday, April 22, however, things do not pan out as expected and real-time traffic conditions at 11:30 AM cause the traffic system 162 to compute a travel time between the Municipal Park and 506 N. 10$^{th}$ at 45 minutes under current conditions. At this time, a user at Municipal Park may not know not know this, but the system can tell them via alerts and notifications. For example, the system may alert the user, via the family/household user device 102, and advise them of the extended travel time to the birthday party. The system may propose that they leave the baseball practice 15 minutes early in order to arrive at the birthday party on-time. Likewise, the system can provide notifications or alerts of changing weather conditions that may impact travel time and likewise propose an adjusted time of departure to the birthday party. Otherwise, the system can send a notice to a contact person for the birthday party to let them know that they will be late. Such notices can be sent by the system using push notices or SMS text messages in non-limiting examples.

In some cases wherein the user has some control over timing of conflicting events, the system can recommend an adjusted starting time in order to allow sufficient time between events for necessary travel. For example, the baseball practice is scheduled to end at 11:00 AM and the family plans to meet for lunch at their favorite restaurant at 11:30 AM. If traffic or weather conditions develop that will cause a delay in getting to the restaurant by 11:30 AM, the system may notify the user before the end of the baseball practice and propose to change the lunch event to 11:45 AM. If the user accepts, notifications and alerts can be sent to other family members of the new start time. Thus, if one parent is at the baseball practice with a first child while another parent is at home with a second child, the system can notify the other parent at home that lunch has been moved to 11:45 AM, perhaps with some explanation for the change of plans.

As another exemplary scenario, suppose the system checks and confirms that there is no issue in travel time from the baseball practice to the restaurant that necessitates a notice or alert of conflict, but there is an issue for the second parent travelling from home to the restaurant to meet for lunch at 11:30 AM. In this case, the system can propose to reschedule lunch to 11:45 AM and if accepted the system can let the parent at the baseball practice know. As such, the system can account for locations and travel times of different drivers attending an event that start from different locations, and provide automated communication and coordination of event status to all parties.

As still another exemplary scenario, suppose the system checks and confirms that there is no issue in travel time from the baseball practice to the restaurant, but en route to the restaurant an accident causes a traffic delay. The system, in view of real-time traffic conditions because of the accident, can determine that the 11:30 AM arrival time at the restaurant can no longer be met. The system can automatically send a notification or alert to the other parent, who may be en route or already at the restaurant, that arrival to the restaurant from the baseball practice will be delayed. Such notification of late arrival may include an expected time or arrival.

The system can also accept payment-by-card transaction for event fees where applicable. For example, a user may receive a notice for a concert or show based on the household profile, and if desired the user can pay the fee for tickets directly from the notice. Electronic tickets, confirmations, and information may be linked to the event from the calendar on the system for ease of retrieval and presentation at the event. Instances of misplaced tickets, or failure to realize that tickets are needed, are therefore avoided.

Figure 2:
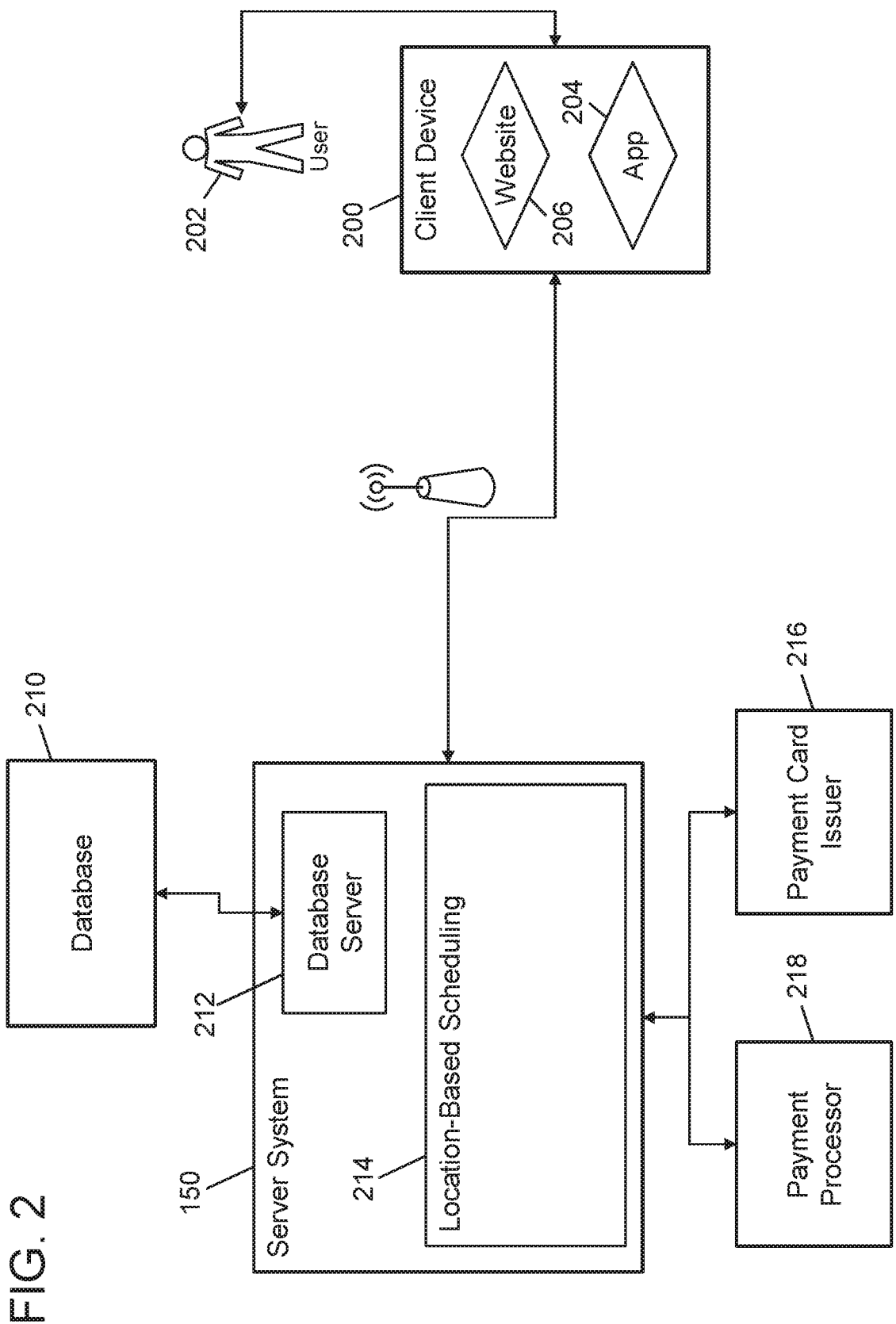
FIG. 2 is a simplified block diagram of a portion of the system shown in FIG. 1.

FIG. 2 is a simplified block diagram of a portion of the location-based event scheduling and coordination system 100 that includes server system 150. Server system 150 includes a location-based scheduling component 214 to identify, manage and resolve location-based conflicts. Location-based scheduling component 214 is in communication with at least one device 200 that may represent the respective devices 102, 154, 156 described above. The device 200 shown may be associated with a user 202, and the user 202 may represent one of the users of the various devices 102, 154 and 156 described above.

For instance, when the device 200 is the family/household user device 102 the user 202 is one of the members of the household. When the device 200 is the client device 154 the user 202 may be a system administrator. When the device 200 is the payment device 156, the user 202 may be an agent of the payment provider.

In some embodiments, the device 200 includes a software application 204 (i.e., a service app) installed on the device 200. In additional embodiments, the device 200 displays a customized website 206 using a web browser installed on the device 200. Such app or website may facilitate identification, acceptance or resolution of rogue authorization charges as well as status information for possible rogue charges.

In the example embodiment, server system 150 is in communication with a payment processor 218 and/or a payment card issuer 216. Payment processor 218 and/or server system 150 may be associated with an interchange network (not shown). Server system 150 is configured to receive transaction data from payment processor 218.

Server system 150 includes a database server 212 connected to a database 210, which contains household profile information, household calendar and scheduled event information, location information, and information transaction data for enrolled cardholders. In one embodiment, database 210 is centralized and stored on server system 150. In an alternative embodiment, database 210 is stored remotely from server system 150 and may be non-centralized. Database 210 may store data relating to events, event locations, merchants, merchant locations, cardholders and system operation. Specifically with respect to the system 100, the database 210 may include a plurality of files of information for enrolled cardholders, as well as recorded data regarding events scheduled on the system, determination of conflicts and outcomes. Over time, the system may adaptively learn user preferences and act accordingly.

In the example embodiment, server system 150 is configured to receive transaction data from payment processor 218. Authorizations for payment-by-card transactions may be made or denied according to conventional practices. Although only one payment card issuer 216, one payment processor 218, one user 202, and one client device 200 are illustrated, it should be understood that the system 100 may include any number of payment card issuers 216, users 202, payment networks 218, and/or devices 200 in communication with server system 150.

Figure 3:
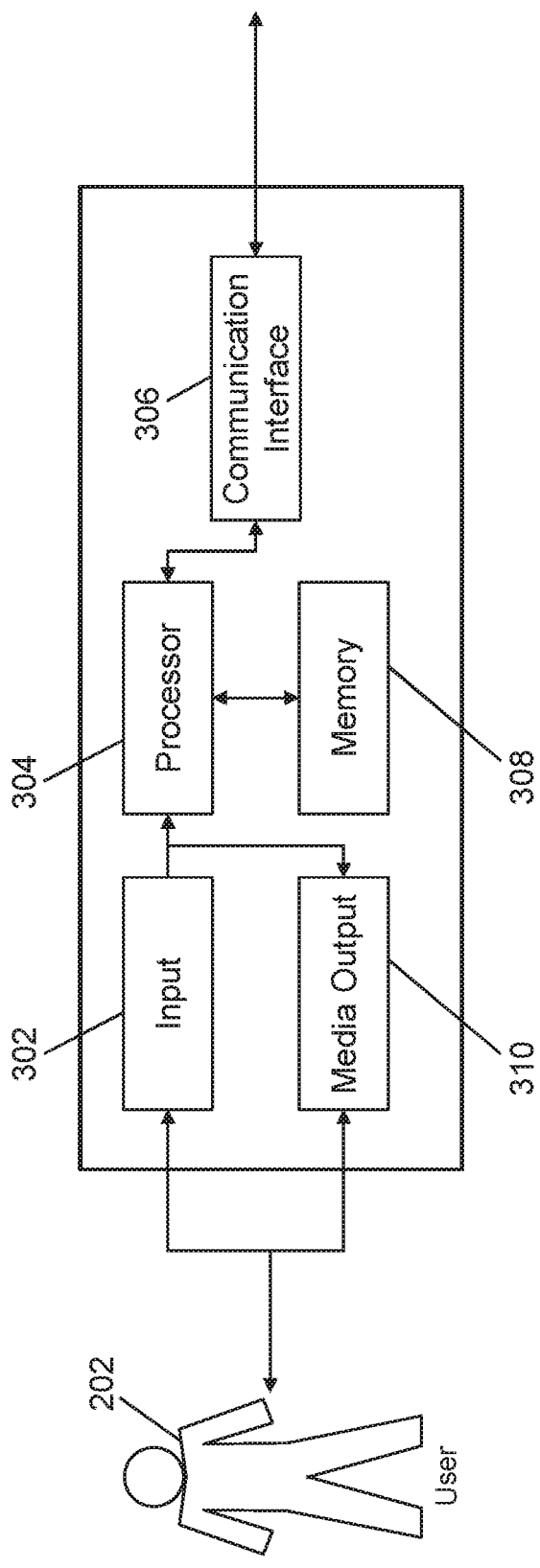
FIG. 3 illustrates an example configuration of a user device for the system shown in FIGS. 1 and 2.

FIG. 3 illustrates an example configuration of a device 200 operated by a user 202, such as any of the users described above. User system 200 may include, but is not limited to, a smart phone, a tablet, and a website. In the example embodiment, device 200 includes a processor 304 for executing instructions. In some embodiments, executable instructions are stored in a memory area 308. Processor 304 may include one or more processing units, for example, a multi-core configuration. Memory area 308 is any device allowing information such as executable instructions and/or written works to be stored and retrieved. Memory area 308 may include one or more computer readable media.

The device 200 may also include at least one media output component 310 for presenting information to user 202. Media output component 310 is any component capable of conveying information to user 202. In some embodiments, media output component 310 includes an output adapter such as a video adapter and/or an audio adapter. An output adapter is operatively coupled to processor 304 and operatively couplable to an output device such as a display device, a liquid crystal display (LCD), organic light emitting diode (OLED) display, or "electronic ink" display, or an audio output device, a speaker or headphones.

In some embodiments, the device 200 includes an input device 302 for receiving input from user 202. Input device 302 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 310 and input device 302. The device 200 may also include a communication interface 306, which is communicatively couplable to a remote device such as the payment processor. Communication interface 306 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 308 are, for example, computer readable instructions for providing a user interface to user 202 via media output component 310 and, optionally, receiving and processing input from input device 302. A user interface may include, among other possibilities, a web browser and client application. Web browsers enable users, such as user 202, to display and interact with media and other information typically embedded on a web page or a website. An application allows user 202 to interact with a server application from a server system.

Figure 4:
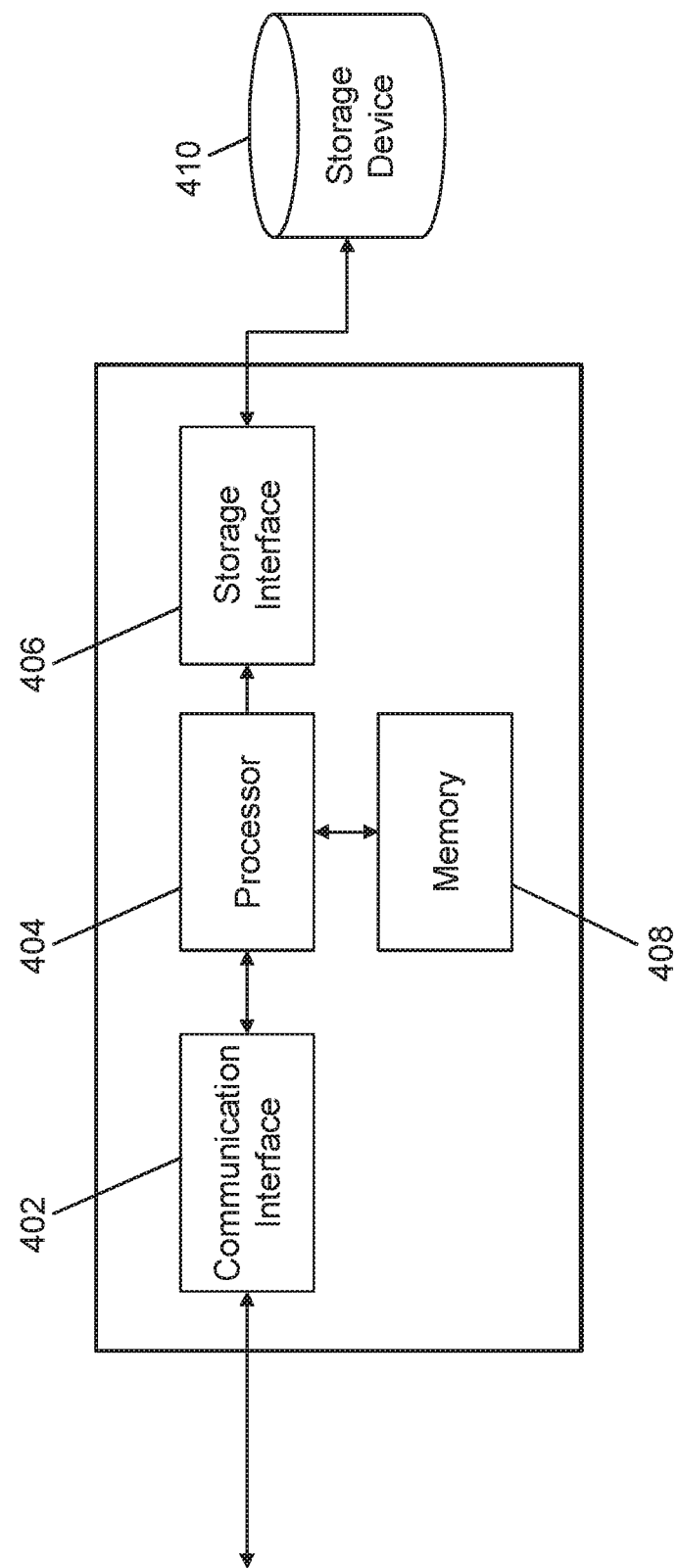
FIG. 4 illustrates an example configuration of a server system as described herein.

FIG. 4 illustrates an example configuration of a server system such as a server system 150 as described herein. Server system 150 is a database used to store user account data, and send, receive, and process signals from various sources. Server system 150 includes a processor 404 for executing instructions. Instructions may be stored in a memory area 408, for example. Processor 404 may include one or more processing units (e.g., in a multi-core configuration) for executing instructions. The instructions may be executed within a variety of different operating systems on the server system 150, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 404 is operatively coupled to a communication interface 402 such that server system 150 is capable of communicating with a remote device such as any of the devices 200 described above or another server system 150. For example, server system 150 may be a server system, wherein communication interface 402 may receive data from payment processor 218.

Processor 404 may also be operatively coupled to a storage device 410. Storage device 410 is any computer-operated hardware suitable for storing and/or retrieving data. In some embodiments, storage device 410 is integrated in server system 150. For example, server system 150 may include one or more hard disk drives as storage device 410. In other embodiments, storage device 410 is external to server system 150 and may be accessed by a plurality of server systems 150. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 is operatively coupled to storage device 410 via a storage interface 406. Storage interface 406 is any component capable of providing processor 404 with access to storage device 410. Storage interface 406 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory area 408 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

The above memory types are exemplary only, and are thus not limiting as to the types of memory usable for storage of a computer program.

Figure 5:
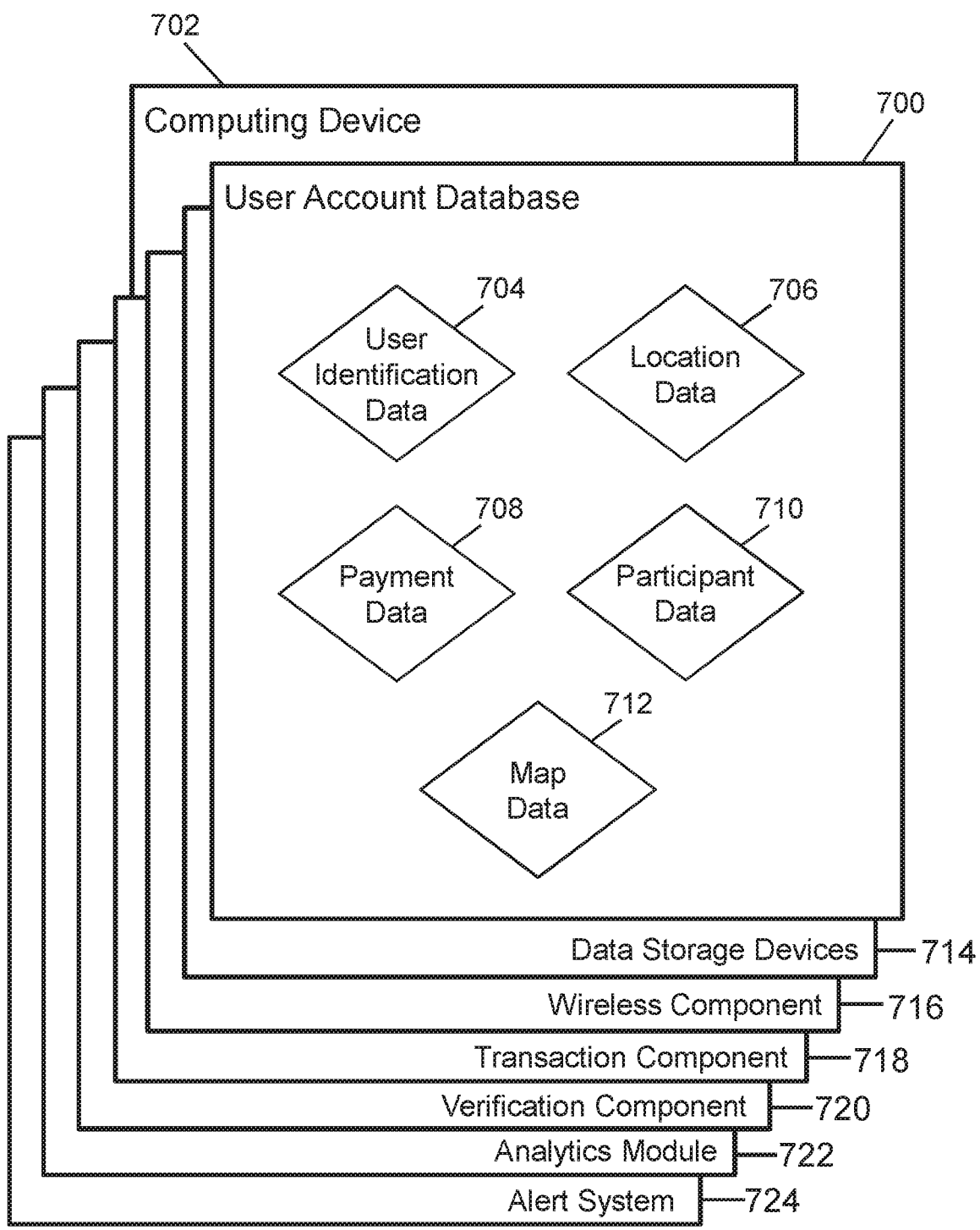
FIG. 5 shows an example configuration of a user account database within a computing device, along with other related computing components, that may be used to create, organize, and monitor a plurality of user data associated with a user.

FIG. 5 shows an example configuration of a user account database 700, within a computing device 702, along with other related computing components, that may be used to create, organize, and monitor a plurality of user data associated with a user account. In some embodiments, computing device 702 is the same or similar to server system 150. User account database 700 is coupled to several separate components within computing device 702, which perform specific tasks.

In the example embodiment, database 700 includes user identification data 704, location data 706, payment data 708, registration data 710, and participant data 712. In contemplated embodiments, user identification data 704 includes, but is not limited to, a user name, a user address, and a user phone number. Location data 706 includes data associated with the instances of possible location-based conflicts in events, data associated with success or failure of confirmations of location-based conflicts and acceptances of schedule adjustments proposed by the system, data associated with card payment transactions completed on the system and issuance of electronic tickets and notifications generated by the system. Payment data 708 includes, but is not limited to, card information, payment history, and a billing address. Merchant data 710 includes information associated with participating merchants that may be associated with events, including merchant identifiers, address information, contact information, etc. Participant data 712 includes data associated with third party information (e.g., system administrators).

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, the locations-based conflict and management described above and below, time to complete transactions and other items of interest. Further included is a verification module 720 that may communicate with a payment system, and an alert module 724 for transmitting an alert to a system user, cardholder, event contact, merchant or an issuer, or to any other interested party concerning events accepted through and managed by the system.

Figure 6:
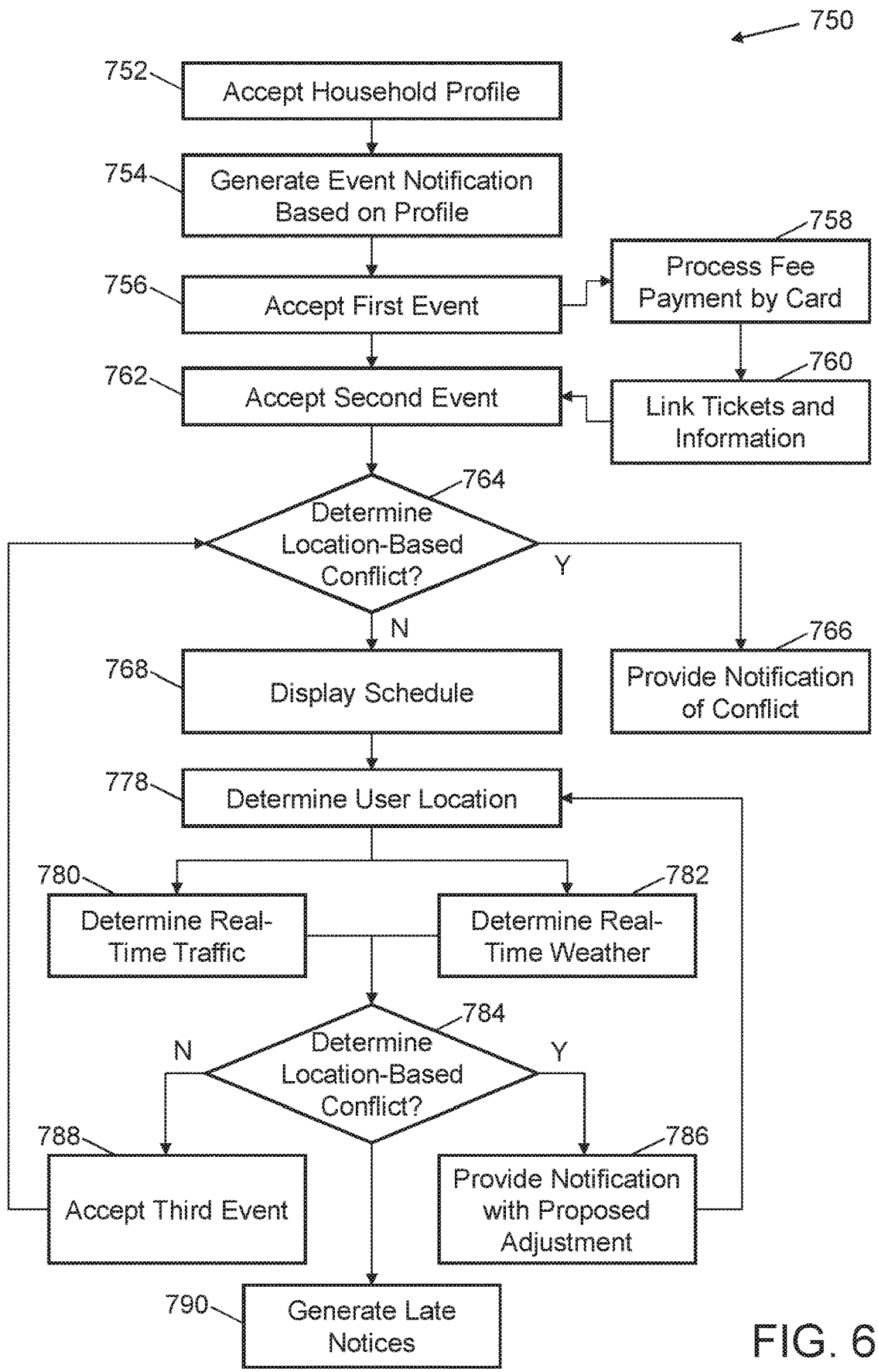
FIG. 6 illustrates an exemplary method flowchart of processes executed by the system shown in FIGS. 1-5.

FIG. 6 shows an exemplary process 750 of location-based event scheduling, coordination and management implemented with the system 100 shown in FIGS. 1-5.

At step 752, the system may accept a household profile from a member of a household such as a parent or head of household using a family/household user device 102. In contemplated examples, the profile may be created while the family/householder device is connected to the host device in the system as described above. The profile may include account creation details such as registration, username and password selection to obtain access the system via a user portal made available through the system. The profile may include payment card account information for payment of event fees for events scheduled on the system. The profile may also include information for each member of the household, such as an identifier (name, nickname, userid etc.), contact information (e.g., a cell phone number for SMS message notification or an email address), age and gender information, and interest information for each member of the household. The interest information relates to possible event notification(s) generated by the system, and may include general fields such as running, hiking, fishing, camping, cooking, gardening or reading. Interest information may also be more specific such as Marathon running, mounting climbing, bass fishing, outdoor grilling, rose gardening or books written by specific authors. Step 752 may serve as an enrollment step for the desired users of the system, and may include opt-in informed consent of users to data usage by the system consistent with consumer protection laws and privacy regulations.

At step 754, the system generates event notices based on the household profile information. The notices include events that match the ages and interests of the household members individually or as a group in view of the household profile. For example, if the household profile indicates running as an interest to one or more family members, the system may generate a notice of an upcoming $5k$ race, an upcoming family fun run, or an upcoming marathon. The notice may include the event name, the date and start/end times of the event, the location/address of the event, and a contact person or link that the user may follow to obtain further information.

Event notices per step 754 can be seen by a household member once logged onto the system, or the system may actively send notifications and alerts outside the system so that a user need not be logged onto the system to see them, including but not necessarily limited to SMS text messages, email messages or push notifications configured to activate a family/household user device and present information concerning events, with options for the user to accept them directly from the notification. If an event is accepted at step 756, it is automatically added or populated to the calendar/schedule maintained on the system at the proper time and date, ensuring the event is calendared and eliminating any chance of human error in calendaring the event. The acceptant at step 756 may include a prompt to the user to add a driver from the household profile that will be responsible for transportation to the event.

At step 758, the user may pay for any fees associated with the event when accepting it on the system. The fee is charged and processed to a payment card on file in the household profile and the associated card payment system and devices connected to the system. If approved, electronic tickets, confirmations, and information needed to enter the event are generated and linked to the event at step 760 on the system.

Of course, events can also be added manually to the calendar as needed or as desired at step 756. Each event added may include a user provided event name, the date and start/end times of the event, a designated driver for the event from the household profile, the location/address of the event, and a contact person and contact information for the event. For example, when calendaring baseball practices and baseball games for a child, the user may enter the coach's contact information, when calendaring a birthday party a user may enter the contact information associated with the invitation, etc. Accepted events may be recurring events, non-recurring events, and special events as described above.

At step 762, when another event is accepted (indicated in FIG. 6 as a second event), the system determines whether the event accepted at step 762 presents a possible (or actual) location-based conflict with a previously accepted event at step 762 (indicated in FIG. 6 as a first event). The system does so by comparing the end time of the first event with the start time of the second event to determine a window of time (i.e., elapsed time or duration) for travel between the location of the first event and the location of the second event (referred to herein as the travel window). The system also determines an expected travel time from the location of the first event to the location of the second event by consulting map and route information using the locations of the first and second events as inputs and receiving an estimated travel time (e.g., driving time). Once the expected travel time is known, it is compared to the travel window for determining the location-based conflict.

If the travel window is less than the expected computing time, a location-based conflict exists and the system proceeds to generate a location-based conflict notice to the user at step 766. The notification may provide options to the user to reschedule the event if possible to avoid the conflict, adjust the start or end times of the events to avoid the conflict, or to cancel one of the first and second events. On the other hand, the user may not wish to proceed with scheduling the second event anyway, but will do so with the knowledge that there are logistical issues presented by the travel window between the two events. The events 766 may be identified and distinguished on the display at 766 as subject to a location-based conflict such that it can easily be distinguished from events that are not subject to a location-based conflict.

If the travel window is greater than the expected computing time, no location-based conflict exists and the system proceeds to display the schedule including the accepted first and second events at step 768. Any member of the household authorized to login to the system may now see the schedule including the accepted events via client portals made available via the system. The display may include conventional calendar views (e.g., month, week, day) that are selectable by the user.

The displays generated by the system at step 768 may also be personalized to each of the different members of the household. For example, a first designated driver may see a first set of events highlighted that the first driver has been assigned to on the system, and a second driver may see a second set of events highlighted that the second driver has been assigned to. As such, drivers and non-drivers may see the events differently on the calendar, although the same events will still be seen. Ticketed events may be identified differently from non-ticketed events as a reminder to an event driver. Additionally, children may see less event information than adults as may be determined from the household profile or other settings or preferences. In general, though, all the authorized household members may see the complete calendar on the system and all currently scheduled events on the calendar.

Via the display at step 768, users may review the calendar on demand and may select events one-by-one on the calendar to see specific event information, driver information, contact information, ticket information and access etc. In the case of events that involve location-based conflicts, information may be made available and presented concerning the conflicts (e.g., the travel window and expected travel time). Users may also be allowed the opportunity to make scheduled adjustments to avoid conflicts as desired. Users may also be allowed options to edit the event information as needed apart from any conflict presented. For example, a user may substitute one driver for another in a particular entry, change or update contact information for the event, and adjust start and end times for events. When any changes or edits are completed, the changes are displayed to other users when logged onto the system. In some cases, wherein changes are made close in time to an event, the system can send notifications to affected household members on family/household devices.

At step 778, as a start time for an event approaches the system checks on the location a user 778. For this step, the user is typically the assigned driver, and the user location may be obtained from the driver's family/household device using, for example, location services built-in to the device. The time for determining the user location may vary depending on the event, and may depend on household profile information and preferences when the profile was created. For example, for a baseball practice event the time of step 778 may be 30 minutes before the practice starts if the expected travel window is only 15 minutes, while for a ticketed event the time of step 778 may set hours in advance. The system may also iteratively check on user location and perform the following steps at predetermined time intervals (e.g., every ten minutes) with in a predetermined time interval before the start of an event.

Knowing the user location per step 778, the system can now consult with traffic and/or weather components at steps 780, 782 and determined real-time travel information for traveling between the user's location and the location of an event. At step 784 the system again determines if a location-based conflict exists. The system may do so by comparing the determined real-time travel information to the expected travel information described above in relation to step 764 when the expected travel time was based on the location that matches the user's location as determined from step 778. For example, when the expected travel time was determined using the user's home as the starting point, and when the user is determined to be at home, the system can compare the expected travel time to the real-time travel information to see if a conflict now exists.

If the real-time travel information reveals a travel time that is less than or equal to the expected travel time as determined when the event was initially scheduled there is no issue. The system may do nothing further, or alternatively may send a confirmation or reminder to the assigned driver of the scheduled event, perhaps including a suggested departure time. The system proceeds to step 788 to accept an additional event (identified in FIG. 6 as a third event). When an additional event is accepted, it is likewise compared to other accepted events to determined location-based conflicts as described above.

If the real-time travel information reveals a travel time that is greater than the expected travel time as determined when the event was initially scheduled a location-based conflict now exists. In response, the system provides a notification to the assigned driver and proposes a possible schedule adjustment at step 786, or suggests an earlier departure time that may avoid the conflict.

When the user is determined to be at a different location at step 768 from which the initial expected travel time had been determined, step 784 may be performed as follows. The real-time travel window to get from the user location to the event location is compared to an available time window (i.e., the start time of the event subtracted from the present time that step 784 is being performed). The reader may realize that the user's actual location in this scenario may be the location of another event, and in that case the available time window may be the time of the next event subtracted from the end time of the event being attended when the step 784 is being performed.

If the real-time travel window is less than the available time traffic window, no location-based issue exists. The system may do nothing further, or alternatively may send a confirmation or reminder to the assigned driver of the upcoming event, perhaps including a suggested departure time. The system proceeds to step 788 to accept an additional event (identified in FIG. 6 as a third event). When an additional event is accepted, it is likewise compared to other accepted events to determined location-based conflicts as described above.

If the real-time travel window is greater than the available time traffic window, a location-based conflict exists and the system proceeds to generate a location-based conflict notice to the user at step 786. The notification may provide options to the user to reschedule the event if possible to avoid the conflict, adjust the start or end times of the events to avoid the conflict, or to cancel one of the first and second events.

As shown at step 790, if a delay occurs en route to an event that will prevent arrival to an event on-time, the system automatically generates late notices to event contacts as determined from the household profile, and also to other household members that may not be present with the driver that experiences delayed travel conditions. Such late notices may be sent via SMS text messages, email messages, or as voice messages and may include general or specific information or explanation as to why the late notice is being sent. Great convenience to the driver, and also assurance to others, is afforded by the late notice feature.

It should now be evident that the system and method dynamically accounts for location-based conflicts at the time of scheduling, at a time or times leading up to the actual event times, and even en route to an event. Mistake, confusion, and location-based surprises is mostly, if not completely avoided, when the system is properly used, and communication is much improved via automated notice functions and alert features built-in to the system. The system can actively manage schedules for different drivers for concurrent or successive events while communicating status information to household members at different locations, and to event contact persons.

The system may also confirm actual arrival at the event, send notifications or confirmations of arrival, and record the actual time of arrival, as well as determined real-time travel windows and expected time travel windows for comparison. Detailed reports can be generated to assess actual performance and accuracy of the system for optimized use thereof.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A location-based event scheduling and coordination system comprising:
    at least one host computing device comprising at least one processor in communication with a memory device, wherein the at least one host computing device is configured to:
    create, via one or more user computing devices, a household profile for a household, the household profile including information for a plurality of users of the household;
    accept, via the one or more user computing devices, from a first user of the plurality of users a first event and a second event at respectively different locations to be successively attended, wherein the first event is to be attended by the first user and the second event is to be attended by a second user of the plurality of users;
    automatically consider, at the at least one processor, location-based information at a first point in time for each of the first event and the second event;
    receive, at the at least one processor, via at least one wireless communication channel, from a first user computing device of the one or more user computing devices executing a first instance of an application, an actual location of the first user, wherein the actual location is provided by the first user computing device via location services built-in the first user computing device;
    receive, at the at least one processor, via the at least one wireless communication channel, from a remote traffic computing device monitoring a plurality of real-time traffic conditions, a set of the plurality of real-time traffic conditions, the set of real-time traffic conditions including real-time traffic conditions from the actual location of the first user to the location of the second event;
    receive, at the at least one processor, via the at least one wireless communication channel, from a remote weather computing device monitoring a plurality of real-time weather conditions, a set of the plurality of real-time weather conditions, the set of real-time weather conditions including real-time weather conditions from the actual location of the first user to the location of the second event;

determine, at the at least one processor, based at least in part on the set of real-time traffic conditions and the set of real-time weather conditions, an expected real-time travel time from the actual location of the first user to the location of the second event;

determine, at the at least one processor, based on the expected real-time travel time, whether a possible scheduling conflict exists between the first event and the second event, wherein the possible scheduling conflict indicates that at least the first user is delayed to the second event;

in response to determining that the possible scheduling conflict exists, automatically adjust, at the at least one processor, a time of arrival of the first user to the second event based on the expected real-time travel time; and transmit, via the at least one wireless communication channel, to a second user computing device of the one or more user computing devices executing a second instance of the application, a notification causing to be displayed on the application executed on the second user computing device, the second user computing device associated with the second user, the notification including at least the adjusted time of arrival of the first user to the second event, the possible scheduling conflict, the real-time traffic conditions from the actual location of the first user to the location of the second event, and the real-time weather conditions from the actual location of the first user to the location of the second event.

2. The system of claim 1, wherein the at least one host computing device is configured to:

automatically determine at the first point in time a first expected travel time from a location of the first event to the location of the second event at a time of acceptance of a scheduling of the second event; and based on the determined first expected travel time from the location of the first event to the location of the second event, notify at least one of the first user and the second user of a possible scheduling conflict.

3. The system of claim 2, wherein the at least one host computing device is further configured to:

automatically determine at a second time subsequent to the first point in time real-time traffic conditions between an actual location of one of the first user and the second user and a location of one of the first event and the second event; and determine a second expected travel time from the actual location to the location of one of the first event and the second event in view of the real-time traffic conditions between the actual location of one of the first user and the second user and the location of one of the first event and the second event.

4. The system of claim 3, wherein the at least one host computing device is further configured to:

automatically determine a possible scheduling conflict based on the second expected travel time; and if a possible scheduling conflict is determined, notify one of the first user and the second user of a proposed adjustment to a scheduling of the second event.

5. The system of claim 2, wherein the at least one host computing device is configured to:

automatically determine at a second time subsequent to the first point in time real-time weather conditions between an actual location of one of the first user and the second user and a location of one of the first event and the second event; and if a possible scheduling conflict is determined, notify one of the first user and the second user of a proposed adjustment to the scheduling of the second event.

6. The system of claim 1, wherein the at least one host computing device is configured to accept profile information for multiple members of the household.

7. The system of claim 1, wherein the at least one host computing device is configured to accept designated event driver information for each of the first event and the second event.

8. The system of claim 1, wherein the at least one host computing device is configured to display, on a display of the one or more user computing devices, a schedule including the first event and the second event to multiple members of the household.

9. The system of claim 8, wherein the display is personalized for each of the multiple members of the household.

10. The system of claim 1, wherein the at least one host computing device is in communication with a payment network for processing a payment-by-card transaction of a fee for at least one of the first event and the second event.

11. The system of claim 10, wherein the at least one host computing device is configured to, if the processed fee is approved, generate a display wherein electronic tickets are linked to the at least one of the first event and the second event.

12. The system of claim 1, wherein the at least one host computing device is configured to accept contact information for scheduled events, and automatically generate late arrival notices based on the location-based information and the contact information.

13. A location-based event scheduling and coordination method, the method implemented by at least one host computing device including at least one processor in communication with a memory device, the method comprising:

creating, by the at least one processor via one or more user computing devices, a household profile for a household, the household profile including information for a plurality of users of the household;

accepting, by the at least one processor, via the one or more user computing devices, from a first user of the plurality of users a first event and a second event at respectively different locations to be successively attended, wherein the first event is to be attended by the first user and the second event is to be attended by a second user of the plurality of users;

automatically considering, by the at least one processor, location-based information at a first point in time for each of the first event and the second event;

receiving, at the at least one processor, via at least one wireless communication channel, from a first user computing device of the one or more user computing devices executing a first instance of an application, an actual location of the first user, wherein the actual location is provided by the first user computing device via location services built-in the first user computing device;

receiving, at the at least one processor, via the at least one wireless communication channel, from a remote traffic computing device monitoring a plurality of real-time traffic conditions, a set of the plurality of real-time traffic conditions, the set of real-time traffic conditions including real-time traffic conditions from the actual location of the first user to the location of the second event;

receiving, at the at least one processor, via the at least one wireless communication channel, from a remote weather computing device monitoring a plurality of real-time weather conditions, a set of the plurality of real-time weather conditions, the set of real-time weather conditions including weather conditions from the actual location of the first user to the location of the second event;

determining, at the at least one processor, based at least in part on the set of real-time traffic conditions and the set of real-time weather conditions, an expected real-time travel time from the actual location of the first user to the location of the second event;

determine, at the at least one processor, based on the expected real-time travel time, whether a possible scheduling conflict exists between the first event and the second event, wherein the possible scheduling conflict indicates that at least the first user is delayed to the second event;

in response to determining that the possible scheduling conflict exists, automatically adjusting, at the at least one processor, a time of arrival of the first user to the second event based on the expected real-time travel time; and transmitting, via the at least one wireless communication channel, to a second user computing device of the one or more user computing devices executing a second instance of the application, a notification causing to be displayed on the application executed on the second user computing device, the second user computing device associated with the second user, the notification including at least the adjusted time of arrival of the first user to the second event, the possible scheduling conflict, the real-time traffic conditions from the actual location of the first user to the location of the second event, and the real-time weather conditions from the actual location of the first user to the location of the second event.

14. The method of claim 13, further comprising:
automatically determining at the first point in time a first expected travel time from a location of the first event to the location of the second event at a time of acceptance of a scheduling of the second event; and
based on the determined first expected travel time from the location of the first event to the location of the second event, notifying at least one of the first user and the second user of a possible scheduling conflict.

15. The method of claim 14, further comprising:
automatically determining at a second point in time subsequent to the first point in time real-time traffic conditions between an actual location of the one of the first user and the second user and a location of one of the first event and the second event; and
determining a second expected travel time from the actual location to the location of one of the first event and the second event in view of the real-time traffic conditions between the actual location of one of the first user and the second user and the location of one of the first event and the second event.

16. The method of claim 15, further comprising:
automatically determining a possible scheduling conflict based on the second expected travel time; and
if a possible scheduling conflict is determined, notifying one of the first user and the second user of a proposed adjustment to a scheduling of the second event.

17. The method of claim 14, further comprising:
automatically determining at a second time subsequent to the first point in time real-time weather conditions between an actual location of one of the first user and the second user and a location of one of the first event and the second event; and
if a possible scheduling conflict is determined, notifying one of the first user and the second user of a proposed adjustment to a scheduling of the second event.

18. The method of claim 13, further comprising accepting profile information for multiple members of the household.

19. The method of claim 13, further comprising accepting designated event driver information for each of the first event and the second event.

20. The method of claim 13, further comprising displaying, on a display of the one or more user computing devices, a schedule including the first event and the second event to multiple members of the household.

21. The method of claim 20, further comprising personalizing the display for each of the multiple members of the household.

22. The method of claim 13, further comprising processing a payment-by-card transaction of a fee for at least one of the first event and the second event.

23. The method of claim 22, further comprising, if the processed fee is approved, generating a display wherein electronic tickets are linked to the at least one of the first event and the second event.

24. The method of claim 13, further comprising accepting contact information for scheduled events, and automatically generating late arrival notices based on the location-based information and the contact information.

* * * * *